July 20, 1965
C. M. HART
3,195,777
ELECTRIC ACTUATED INSECT SPRAY
Filed Aug. 14, 1963
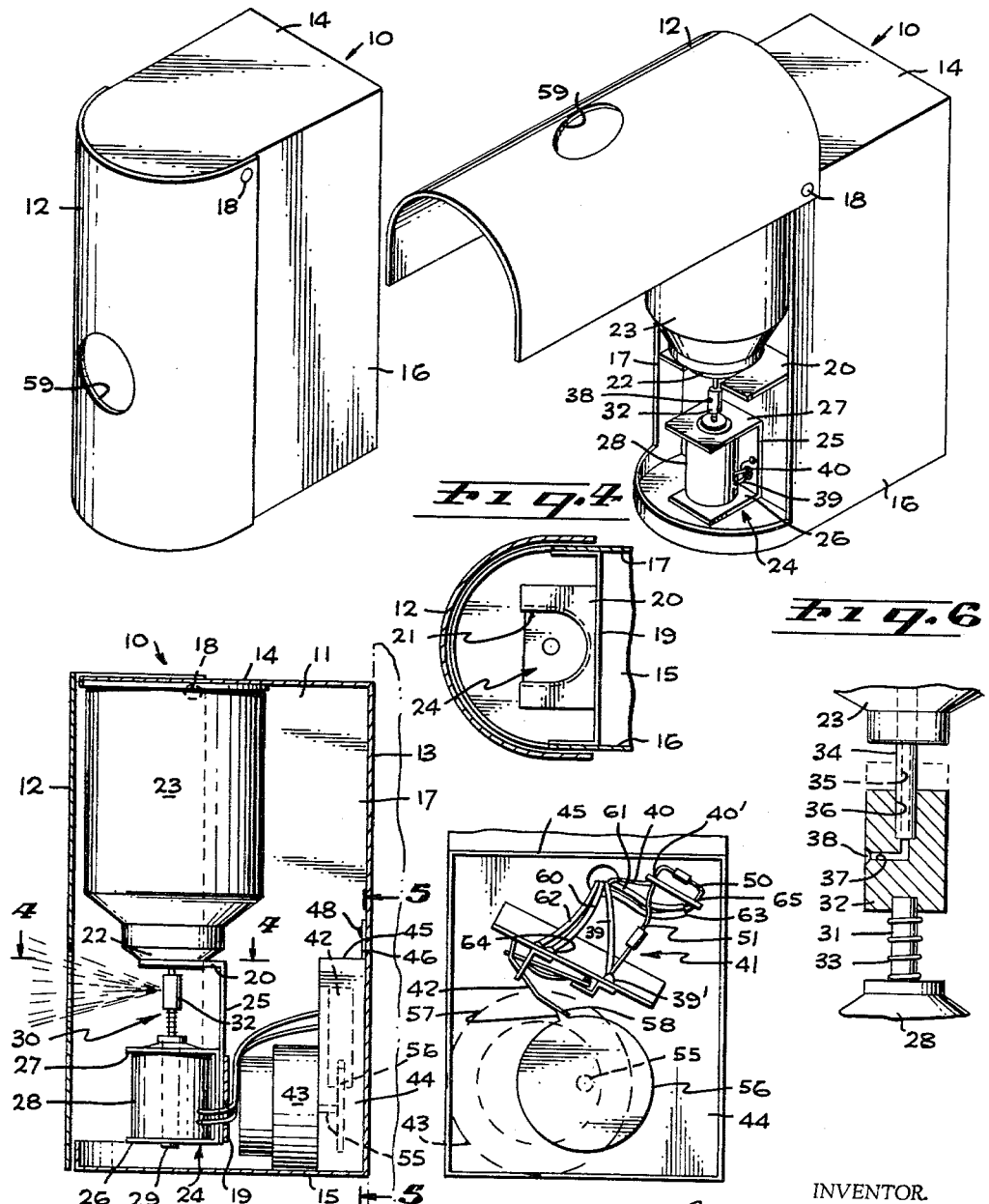
INVENTOR.
CHARLES M. HART
BY
Beehler & Shanahan
ATTORNEYS United States Patent Office 3,195,777
Patented July 20, 1965

3,195,777
ELECTRIC ACTUATED INSECT SPRAY
Charles M. Hart, Downey, Calif., assignor to Vita-Pakt Citrus Products Co., Covina, Calif., a corporation of California
Filed Aug. 14, 1963, Ser. No. 302,057
5 Claims. (Cl. 222—.70)

The invention relates to insecticide spraying devices and has special reference to an electric actuated time-operated dispenser by means of which blasts of insecticide spray can be ejected at periodic intervals from a pressurized spray container.

In the use of insecticides, it has been found that single operation spray mechanisms, although effective temporarily, seldom can be depended upon form effectiveness over any substantially sustained length of time. This is especially true of aerated sprays which are intended to discourage insect infestation in the atmosphere, such for example as the bothersome effect of flies and mosquitoes around out-of-door premises. Where the object is to permeate the atmosphere of a selected location with an aerated insect spray, there must always be present in the atmoshpere a sufficient amount of the insecticide, since otherwise the insects will continually fly into the area whenever the concentration of the insecticide is not sufficient to act as a deterrent.

Although it might be supposed that some steady, sustained ejection of insecticide into the atmosphere would accomplish the intended purpose, such an expedient is not feasible. In the first place, a steady ejection is by no means economical, inasmuch as it consumes far more of the insecticide material than may be needed. Also, if an ejecting spray were cut down enough to be economically usable, it would not have sufficient force and effect to encompass any appreciable area. Larger concentrations, on the other hand, sufficient to deter insects, may be objectionable to persons occupying the space which is to be treated.

Further still, although it is appreciated that a clockwork mechanism may be designed into a mechanical device so that it operates at intervals timed by the clock, where clock power is depended upon to trip a trigger with sufficient force to release an insecticide held under pressure in a container, the amount of force required to do such a job effectively requires a considerable amount of clockwork power. To supply this, the clockwork has to be of appreciable size and potential which means that the cost of such a mechanism is also appreciable. Consequently, those devices heretofore designed to be operated by clockworks have been of such cost that they permit installation only in commercial establishments such as stables and dairies, but have been too high in cost to be merchandized for the ordinary homeowner who might have use for a device of this kind in small quarters such as an out-of-door patio.

It is therefore among the objects of the invention to provide a new and improved electric actuated and periodically operating insect spray which operates on dependable timing and which needs relatively little power.

Another object of the invention is to provide a periodically operating insect spray device powered by electricity from the same electric connection as may be employed for manipulating an electric timing clock.

Still another object of the invention is to provide a new and improved periodically operating electrically actuated insect spray mechanism which is compact, inexpensive and sufficiently simple in its design so that it will not readily get out of order over a long period of use.

A further object of the invention is to provide a new and improved electric actuated insect spray mechanism which is sufficently small and compact so that it can be advantageously located in a small, compact specially designed chamber, which when in use can be located inconspicuously on the premises.

Also included among the objects of the invention is to provide a new and improved periodically actuated, electric operated spray device which can be readily located so as to direct the spray ejection in virtually any desired location and having a design such that the entire contents of a pressurized spray container can be entirely used in a fashion such that little or none of it is wasted.

The invention also includes the design and construction of a device of the class made reference to which is sufficiently inexpensive to be within the purchasing power of the average homeowner.

With these and other objects in view, the invention consists in the construction, arrangement and combination of the various parts of the device, whereby the objects contemplated are attained, as hereinafter set forth, pointed out in the appended claims and illustrated in the accompanying drawings.

In the drawings:

FIGURE 1 is a front perspective view of the housing which contains the receptacle and operating mechanism.

FIGURE 2 is a perspective view similar to FIGURE 1 but with the cover lifted to give access to the interior.

FIGURE 3 is a longitudinal sectional view of the device in assembled operating condition.

FIGURE 4 is a cross-sectional view taken on the line 4—4 of FIGURE 3.

FIGURE 5 is a side elevational view of the switching mechanism, taken on the line 5—5 of FIGURE 3.

FIGURE 6 is an enlarged fragmentary longitudinal sectional view of the jet employed for ejection.

In an embodiment of the invention chosen for the purpose of illustration, there is shown a housing indicated generally by the reference character 10, providing a chamber 11 which is enclosed by employment of a cover 12. The housing includes a rear wall 13, top and bottom walls 14 and 15 respectively, and opposite side walls 16 and 17. The cover 12 is hinged at pivot points 18 so that it can be lifted from a lowered, closed position, as shown in FIGURE 1, to a lifted upper position, as shown in FIGURE 2.

Within the chamber 11 is a partition 19 forming a bracket, the partition being secured to the side walls 16 and 17 as shown in FIGURE 4 by some appropriate means such, for example, as spot welding. The partition includes an upper plate 20 extending forwardly and provided with a recess 21 for reception of a neck 22 of a pressurized fluid container 23.

Also secured to the partition 19 is a shelf indicated generally by the reference character 24, the shelf having a substantially U shape with a base 25 attached to the partition, as shown in FIGURES 2 and 3, a lower plate 26 extending forwardly at the lower end and an upper plate 27 extending forwardly at the upper end.

Resting on the lower plate is a solenoid 28, the coils of which encompass the lower end 29 of a reciprocating plunger means, indicated by the reference character 30. The plunger means extends upwardly from the lower end and consists of a shaft 31 of reduced diameter at the upper end of which is a collar 32. A spring 33 normally tends to hold the plunger means in an upwardly extended position, as shown to good advantage in FIGURE 6.

The container 23 is provided with a tubular trigger 34 which, acting in a well-known fashion, is adapted to be depressed in order to release the contents of the container. As shown, the tubular trigger has a passageway 35 extending centrally through it. At the upper end of the collar 32 is a bore 36 which receives the trigger when in assembled and operative condition, the bore 36 being in communication with a lateral extension 37 of the same which communicates into a side opening jet 38.

Power to operate the solenoid 28 is best supplied directly from a 110-volt line, which enters the solenoid by means of an electric lead 39 and leaves by way of an electric lead 40. One lead 39 is connected to one side 39' of a switching device 41, shown in FIGURE 5. The other lead 40 attaches to a binding post 40'. Conventional fused guard lines are shown at 50 and 51. The switching device may be of any one of a number of different types wherein there is provided an armature 42 extending outwardly from the switching device to a position where it can be tripped periodically, thereby to periodically close the circuit supplying the solenoid 28 through leads 39 and 40.

To operate the switching device, there is provided an electric timer 43, which is shown attached to a removable mounting plate 44. For convenience, the mounting plate may be constructed with a top wall 45 adjacent to which is a latch 46 attached to a rear wall 13 of the housing 10 by means of a pivot pin 48. When the mounting plate rests upon a bottom wall 15 of the housing 10, the latch 46 may be pivoted into position, locking the mounting plate in place.

The electric timer 43 is of substantially conventional and commercially available construction and is selected so as to be capable of an output of four revolutions per hour, for example, applied to a drive shaft 55. On the drive shaft is a cam wheel 56 from the perimeter of which extends a cam 57 having a sloping cam face 58. As shown in FIGURE 5, the armature 42 extends into the path of movement of the cam 57 so that when the cam passes the point of engagement with the end of the armature 42, it will move the armature sufficient to trip the switching device 41 to an adjustment closing the circuit through the leads 39 and 40, thereby to energize the solenoid 28. The electric timer 43 because of the very light load required of it merely to trip an armature on what is virtually a hair-trigger basis can be a motor having a very low power output and wired in conventional fashion through leads 60, 61 to a customary 110-volt circuit supplied from wires 62 and 63 at binding posts 64 and 65 respectively. The 110-volt circuit is relied upon to drive the timer constantly and to power the solenoid intermittently; hence there is preferably no interconnection electrically between these last mentioned devices, because of the different power requirements, the connections to the power lines being merely made at the same location as a matter of convenience.

In operation the container 23 is inserted into the housing 14 by first projecting the tubular trigger 34 into the bore 36 of the collar 32 and the container then angled into the position of FIGURES 2 and 3, where it is held by a slight pressure of the upper plate 20 against the neck 22 of the container. This need be no more than a snug, resilient fit, since the broad base of the container acting against the top wall 14 will be sufficient to hold the container in proper position. When the solenoid 28 is then energized at periodic intervals, the core 29 moves upwardly forcing the shaft 31 and collar 32 upwardly. This action in turn drives the trigger 34 upwardly into the container a distance sufficient to release contents of the container under pressure. The release of the pressurized contents results in a flow through the passageway 35 of the trigger downwardly into the lateral extension 37 and then outwardly relative to the side-opening jet 38. By providing a hole 59 in the cover 12 in alignment with the side-opening jet 38 and making the hole 59 large enough, the jet of fluid thus expelled can be readily directed outwardly from the mechanism. Good practice suggests that a relatively short burst of vaporized insecticide from the side-opening jet once about every fifteen minutes will be sufficient in most instances to disperse an amount of insecticide into the air to effectively prevent infestation of insects into the average out-of-door space.

Further still, because of the no more than momentary tripping of the armature 42 of the switching device 41, power will be supplied to the solenoid 28 for only an instant. Accordingly, there will be nothing but one short puff of the aerated insecticide spray emitted at the selected interval, but this under most circumstances is sufficient to dispense insecticide enough to be effective. By this periodic ejection of insecticide, a single container will last an appreciable length of time. When however the container is emptied, the cover 12 can be lifted as shown in FIGURE 2, the container tilted upwardly out of engagement with the upper plate 20 and the collar 32 and a new container of similar construction inserted, whereupon the device is immediately ready for operation as promptly as the cover is lowered into closed position.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. An electrically actuated pressure spray for insecticides operating at timed intervals comprising a housing and a pressurized liquid container mounted on said housing, said container having a hollow tubular trigger, a trigger actuator comprising an electric motor means having a reciprocating plunger means extending toward said trigger and in axial alignment therewith, said plunger means having a bore receptive of said trigger and a side opening jet in communication with said bore, and a periodic timer for passing energizing electric current to said electric motor means comprising a trip wheel having a rotatably mounted axle and a cam on said wheel, an electric switch mounted on said support having a resiliently reacting actuating armature extending into the path of movement of said cam, said cam having a dwell period of engagement with said armature whereby to provide a limited continuous electric contact, a drive mechanism on said housing operably connected to said axle and an electric connection from said switch to said electric motor means, whereby at intervals determined by the frequency of rotation of said cam said electric motor means is energized to effect a tripping of said trigger and cause spray to pass through said jet into the atmosphere.

2. An electrically actuated pressure spray for insecticides operating at timed intervals comprising a housing, a bracket in the housing and a pressurized liquid container mounted on said bracket, said container having a hollow tubular trigger, a trigger actuator comprising a solenoid having a reciprocating plunger extending toward said trigger and in axial alignment therewith, a collar on said plunger having a bore receptive of said trriger and a side opening jet in said collar in communication with said bore, and a periodic timer connected to the solenoid adapted to periodically trip said trigger, to effect a spray from said jet into the atmosphere.

3. An electrically actuated pressure spray for a pressurized insecticide container having a central spray valve element at the top thereof and operating at timed intervals comprising a housing including side walls, an upper wall, a lower wall, a back wall and an opening opposite said back wall, a bracket member mounted in said container, said bracket member having an upper element parallel to and spaced from said top wall and adapted to hold said container with the top of the container confined by said upper element, said upper element having a hole therein encompassing said spray valve element, a lower element for said bracket and a solenoid mounted on said lower element in axial alignment with said spray valve, a reciprocating plunger in said solenoid having a releasable operating engagement with said spray valve element, and an electric timing system in said container in operative association with said solenoid whereby to periodically actuate said spray valve element.

4. The electrically actuated spray for a pressurized insecticide container of claim 3 including a removable cover for said opening having a hinged connection to said container, said cover having an opening therein in horizontal alignment with said spray valve element when said cover is in closed position.

5. An electrically actuated pressure spray for a pressurized insecticide container having a central spray valve element at the top thereof and operating at timed intervals comprising a housing including side walls, an upper wall, a lower wall, a back wall and an opening opposite said back wall, a bracket member mounted in said container, said bracket member having an upper element parallel to and spaced from said top wall and adapted to hold said container with the bottom of the container confined by said top wall and the top of said container confined by said upper element, said container being mounted in front of forward edges of said side walls, said upper element having a hole therein encompassing said spray valve element, a lower element for said bracket and a solenoid mounted on said lower element in axial alignment with said spray valve, a reciprocating plunger in said solenoid having a releasable operating engagement with said spray valve element, an electric timing system in said container in operative association with said solenoid whereby to periodically actuate said spray valve element, and a removable cover for said opening having a hinged connection to said container, said cover having an opening therein in horizontal alignment with said spray valve element when said cover is in closed position, said portions of said cover having positions encircling said container when in closed position and removed from said container in open position whereby to facilitate removal and replacement of said container.

References Cited by the Examiner
UNITED STATES PATENTS

| | | | |
|---|---|---|---|
| 1,190,558 | 7/16 | Knudtson | 222—182 |
| 2,715,481 | 8/55 | McGhie | 222—320 X |
| 2,792,920 | 5/57 | Sutphen | 194—6 |
| 2,980,298 | 4/61 | Hanson | 222—182 |
| 3,107,821 | 10/63 | Lambert | 222—182 X |
| 3,127,060 | 3/64 | Vosbikian et al. | 222—70 |

LOUIS J. DEMBO, *Primary Examiner.*